US011589332B2

(12) United States Patent
Carey

(10) Patent No.: US 11,589,332 B2
(45) Date of Patent: Feb. 21, 2023

(54) AUTOMATICALLY SUSPENDING OR REDUCING PORTABLE DEVICE NOTIFICATIONS WHEN VIEWING AUDIO/VIDEO PROGRAMS

(71) Applicant: DISH Network L.L.C., Englewood, CO (US)

(72) Inventor: Ryan Richard Carey, Denver, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 281 days.

(21) Appl. No.: 16/923,955

(22) Filed: Jul. 8, 2020

(65) Prior Publication Data
US 2022/0015062 A1 Jan. 13, 2022

(51) Int. Cl.
H04N 21/41 (2011.01)
H04N 21/4223 (2011.01)
H04N 21/436 (2011.01)
H04N 21/442 (2011.01)
H04N 21/475 (2011.01)
H04N 21/81 (2011.01)
H04W 68/02 (2009.01)
H04N 21/414 (2011.01)
(Continued)

(52) U.S. Cl.
CPC .......... *H04W 68/02* (2013.01); *G06V 40/166* (2022.01); *H04N 21/41407* (2013.01); *H04N 21/44209* (2013.01); *H04N 21/4524* (2013.01); *H04N 21/4532* (2013.01); *H04N 21/4882* (2013.01); *H04W 4/021* (2013.01)

(58) Field of Classification Search
CPC .... H04W 68/02; H04W 4/021; G06V 40/166; H04N 21/41407; H04N 21/44209; H04N 21/4524; H04N 21/4532; H04N 21/4882; H04N 21/4126; H04N 21/4223; H04N 21/43615; H04N 21/44218; H04N 21/44222; H04N 21/44227; H04N 21/4755; H04N 21/478; H04N 21/8126
See application file for complete search history.

(56) References Cited

U.S. PATENT DOCUMENTS 9,454,251 B1 * 9/2016 Guihot ................... G08C 17/02
10,349,234 B1 * 7/2019 Rivkin .................... H04W 4/12
(Continued)

OTHER PUBLICATIONS

International Search Report and Written Opinion, dated Sep. 2, 2021, for International Application No. PCT/US2021/040202, 24 pages.

*Primary Examiner* — Asghar H Bilgrami
(74) *Attorney, Agent, or Firm* — Jeremiah J. Baunach; VLP Law Group LLP

(57) ABSTRACT

A facility for selectively suppressing notifications on a portable device is described. The facility accesses data characterizing the condition of the portable device. The facility infers from the accessed data that that the portable device is being carried by a person who is viewing content being played by a media player device. In response to this inference, the facility determines whether notifications should be suppressed on the portable device. If the facility determines that notifications should be suppressed on the portable device, it causes a wireless communication to be transmitted to the portable device instructing the portable device to suppress notifications.

4 Claims, 6 Drawing Sheets

(51) Int. Cl.
*H04N 21/488* (2011.01)
*G06V 40/16* (2022.01)
*H04N 21/45* (2011.01)
*H04W 4/021* (2018.01)

(56) References Cited

U.S. PATENT DOCUMENTS

| | | |
|---|---|---|
| 2004/0183749 A1 | 9/2004 | Vertegaal |
| 2014/0270683 A1 | 9/2014 | Zhu et al. |
| 2016/0014062 A1* | 1/2016 | Patel .................... H04L 51/212 |
| | | 709/206 |
| 2019/0013960 A1* | 1/2019 | Sadwick ................ H05B 47/19 |
| 2019/0289367 A1* | 9/2019 | Siddiq .................. H04N 21/485 |
| 2020/0053410 A1* | 2/2020 | Anguiano .......... G06Q 30/0255 |

* cited by examiner

AUTOMATICALLY SUSPENDING OR REDUCING PORTABLE DEVICE NOTIFICATIONS WHEN VIEWING AUDIO/VIDEO PROGRAMS

BACKGROUND

Audio/video programs have the capacity to be highly engaging, entertaining, and/or informative. These can include, for example, television programs, movies, plays, music videos and concerts, classes, video blogs, speeches by government officials, space launches, natural disaster coverage, etc.

In some cases, people view audio/video programs in partly- or fully-specialized rooms designed to improve the viewing experience. These rooms may include a large, high-resolution video screen; a high-fidelity, high-power audio system; comfortable furniture; optimized light levels; sonic isolation; etc.

DETAILED DESCRIPTION

Figure 1:
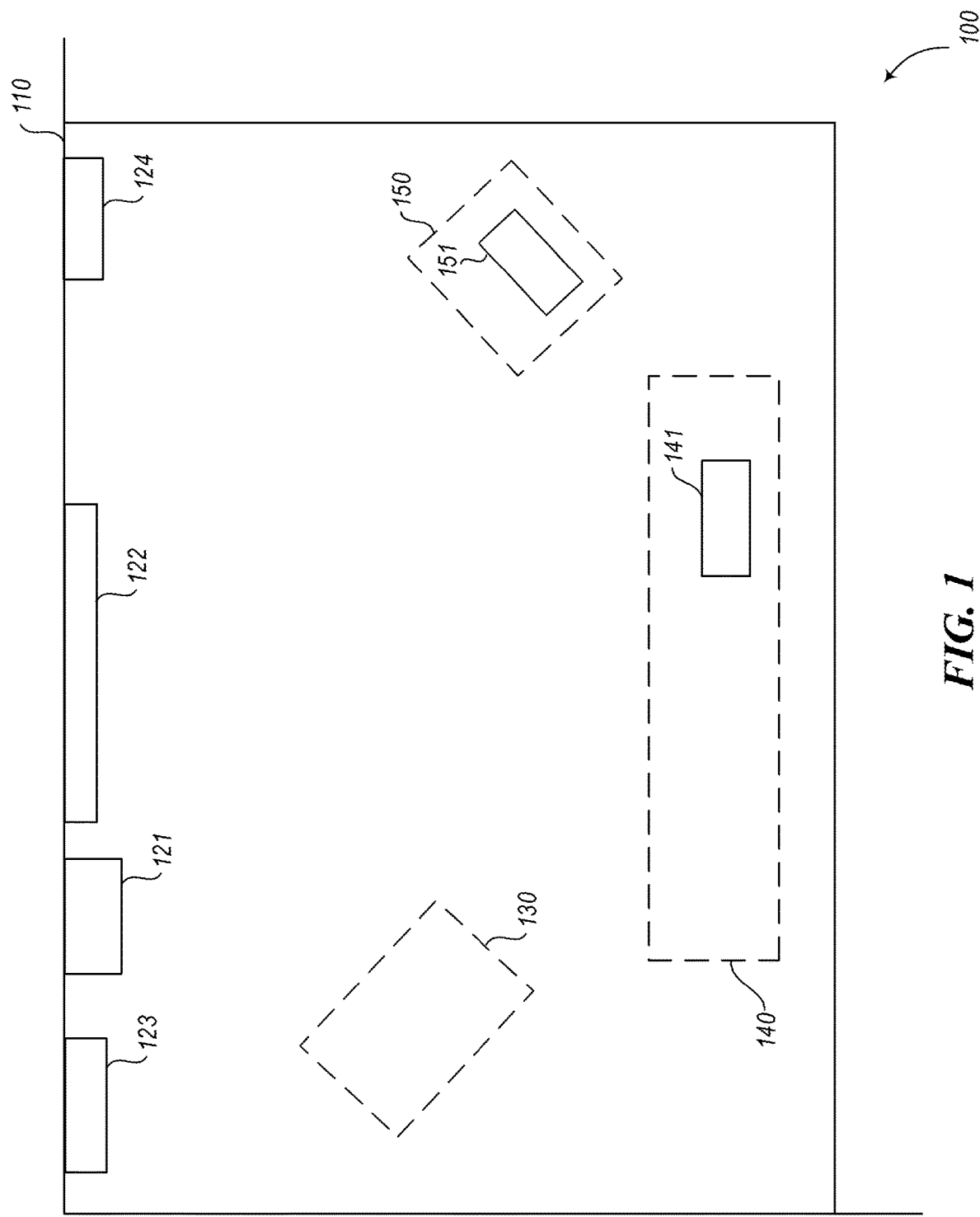
FIG. 1 is a floor plan diagram showing a media viewing room in which the facility operates in some embodiments.

The inventor has recognized that, at the same time that improvements across different technology areas have improved the experience available to those viewing audio/video content at home, the increasing use of mobile electronic devices often ameliorates these improved viewing experiences. A home viewer of audio/video content may carry with them a portable electronic device such as a smartphone, tablet computer, laptop computer, smart watch, augmented-reality glasses, or a wearable device of another type. While viewing audio/video content, they may receive communications on the portable device, such as audio calls, audio/video calls, email messages, text messages, social media platform messages, etc. In many cases, the portable device responds to the receipt of such communications with a notification: output designed to direct the attention of the mobile device's carrier to the received communication. A notification may involve one or more of a vibration or other haptic output; sounds of various kinds and durations; flashing lights; symbols, text, or animations displayed on a screen of the portable device; etc. The inventor has recognized that the occurrence of a notification alone is in many cases enough to distract the portable device's carrier from the audio/video content they are viewing, reducing the value of the watching experience to them. The inventor has further recognized that a notification may disturb an audio/video viewer other than the one carrying the portable device that produced the notification.

Beyond that, however, the inventor has recognized that it common for the carrier of a portable device to respond to the occurrence of a notification by focusing their attention on the communication that is the subject of the notification, such as by reading the communication, replying to the communication, accepting and conducting an incoming call, etc., which further removes their attention from the audio/video viewing, and may further impact the attention of other viewers.

Even further, the inventor has recognized that some carriers of portable devices respond to a notification by leaving the room where their audio/video viewing is occurring, totally interrupting their audio/video viewing.

In response to recognizing the ways in which notifications on portable devices carried by people viewing audio/video content interrupt those people's engagement with and enjoyment of the audio/video content, the inventor has conceived and reduced to practice a software and/or hardware facility for automatically suspending or reducing such notifications in this situation ("the facility").

The facility identifies portable devices whose carriers it predicts are viewing audio/video content, and temporarily reconfigures these portable devices to reduce or completely suppress notifications. In various embodiments, the facility's prediction is based on the presence of the portable device or the person near a media player device, within the borders of a room containing the media player device, or within hearing distance of its ongoing audio stream; whether the media player device is presently playing audio/video content; and the level of user interaction with the portable device. In some embodiments, the facility considers the type of content being played by the media player device, other attributes of the content being played, and/or control interactions with the media player device—in some cases relative to content preferences expressed explicitly or implicitly by the person. In some embodiments, the facility selectively suppresses notifications according to a hierarchy of notification types.

By performing in some or all of the ways discussed above, the facility allows viewers to more fully enjoy and appreciate viewing audio/video content.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. As one example, by suspending notifications as described, the facility avoids the expenditure of processing resources and battery capacity that would be used in performing notifications that are suspended, preserving these resources for use in performing other tasks.

FIG. 1 is a floor plan diagram showing a sample media viewing room in which the facility operates in some embodiments. The room 110 is part of a house or other home 100. The room contains a media player device 121, such as a set-top box for satellite or cable television service, a digital video recorder, a DVD or Blu-ray player, or an internet-connected audio or video streaming device. The media player is connected to a video display screen 122, such as a via a wired or wireless connection. The media player is also connected to audio speakers 123 and 124, such as via a wired or wireless connection. When the media player plays audio/video content, it causes the audio portion of this content to be played by the speakers and the video portion of this content to be presented on the screen. People may control the media player to play content in a variety of ways, such as by touching controls on the media player, interacting with dedicated remote controls, interacting with universal remote controls, interacting with portable devices on which are installed remote control applications, speaking instructions, etc. In some embodiments, two or more of components 121-124 are combined in the same device, such as speakers combined with the screen, the media player combined with the screen, etc. The sample room contains furniture on which people can sit or otherwise repose, such as furniture 130, 140, or 150. The diagram shows a person 141 sitting on a couch 140, and another person 151 sitting on a chair 150. Both people are generally facing the screen.

Figure 2:
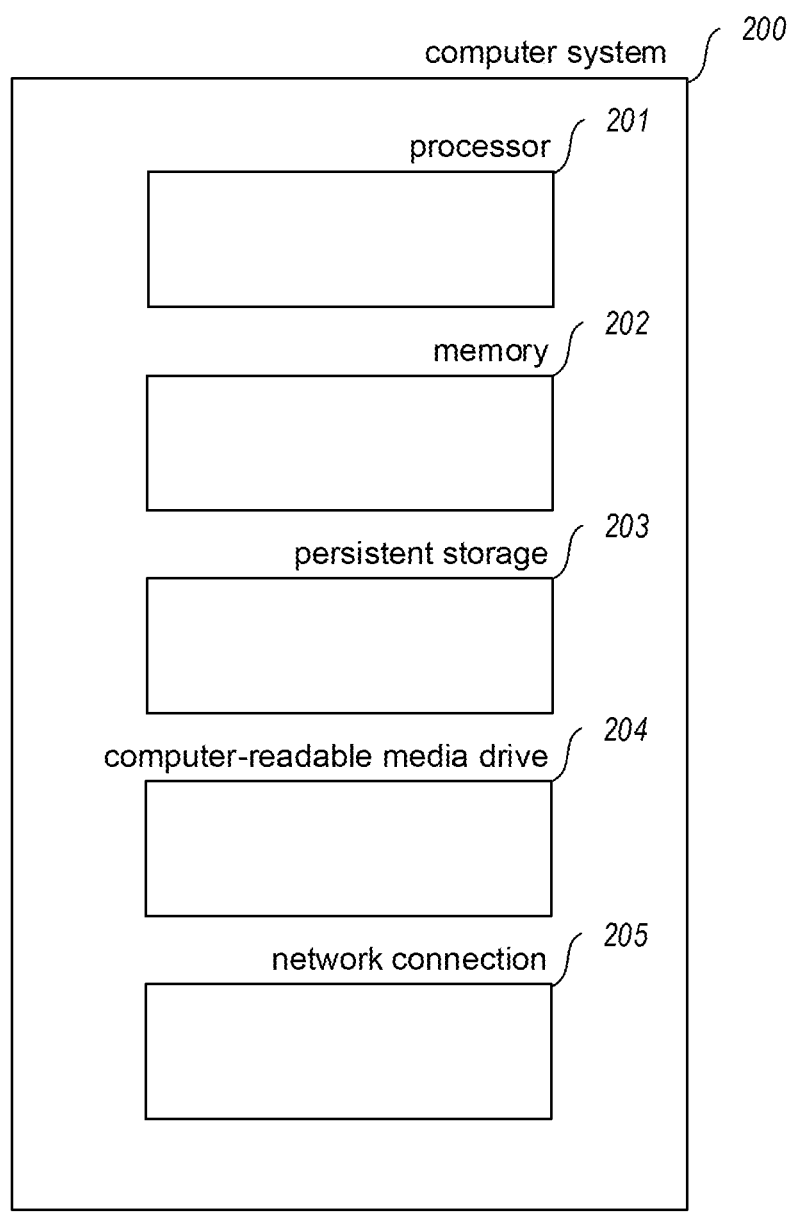
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, tablet computer systems, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or received data, such as a switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configures, and having various components.

Figure 3:
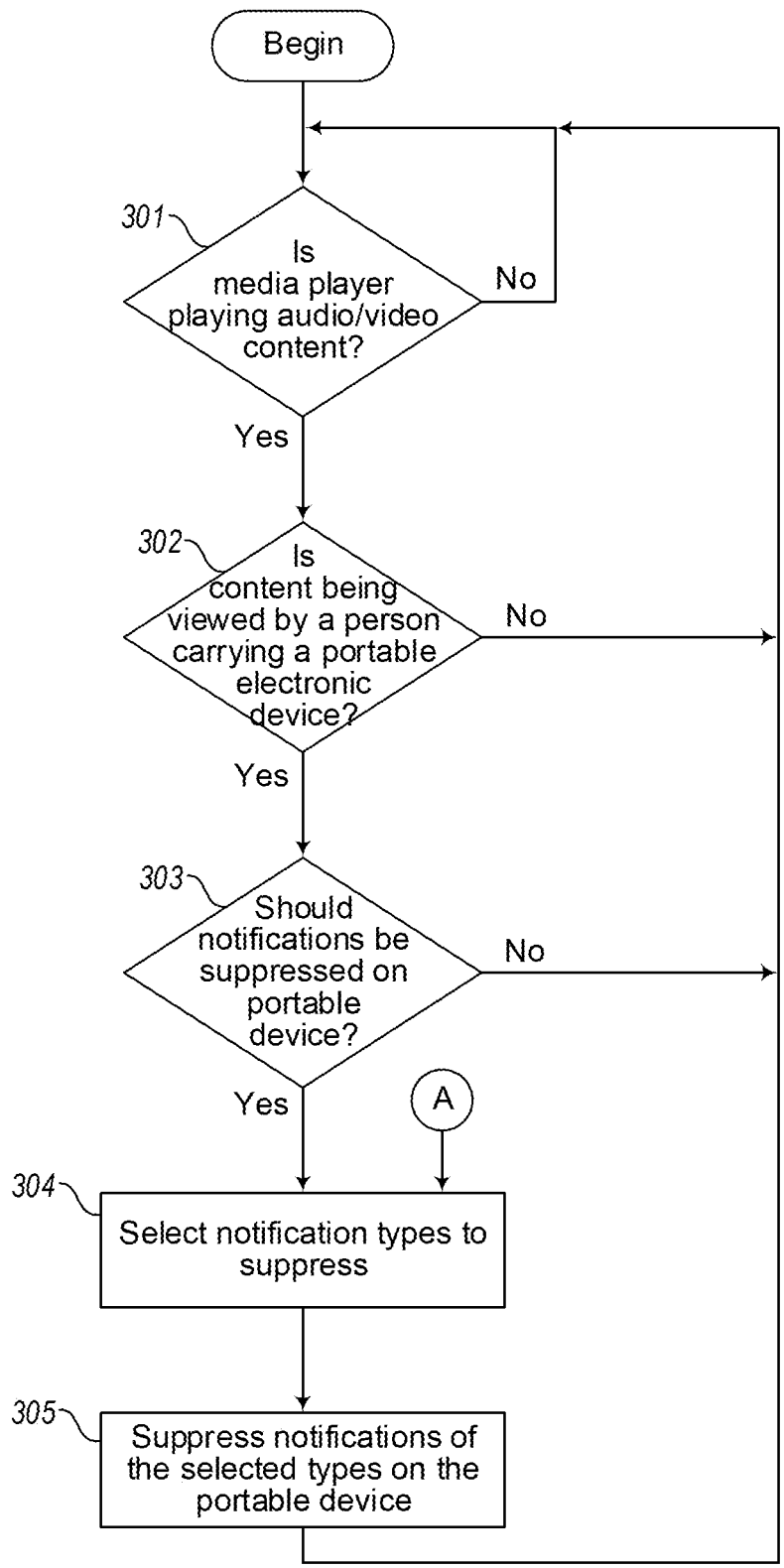
FIG. 3 is a flow diagram showing a process performed by the facility in some embodiments to suppress portable device notifications.

FIG. 3 is a flow diagram showing a process performed by the facility in some embodiments to suppress portable device notifications. In various embodiments, the facility performs this process in the media player, apps or other programs installed on portable devices, physical servers, and/or virtual cloud servers. In act 301, if the media player is playing audio/video content, then the facility continues in act 302, else the facility continues in act 301. In act 302, if the content is being viewed by a person carrying a portable electronic device, then the facility continues in act 303, else the facility continues in act 301. In some embodiments, as part of act 302, the facility makes a prediction about whether content is being viewed by a person carrying a portable electronic device.

Figure 4:
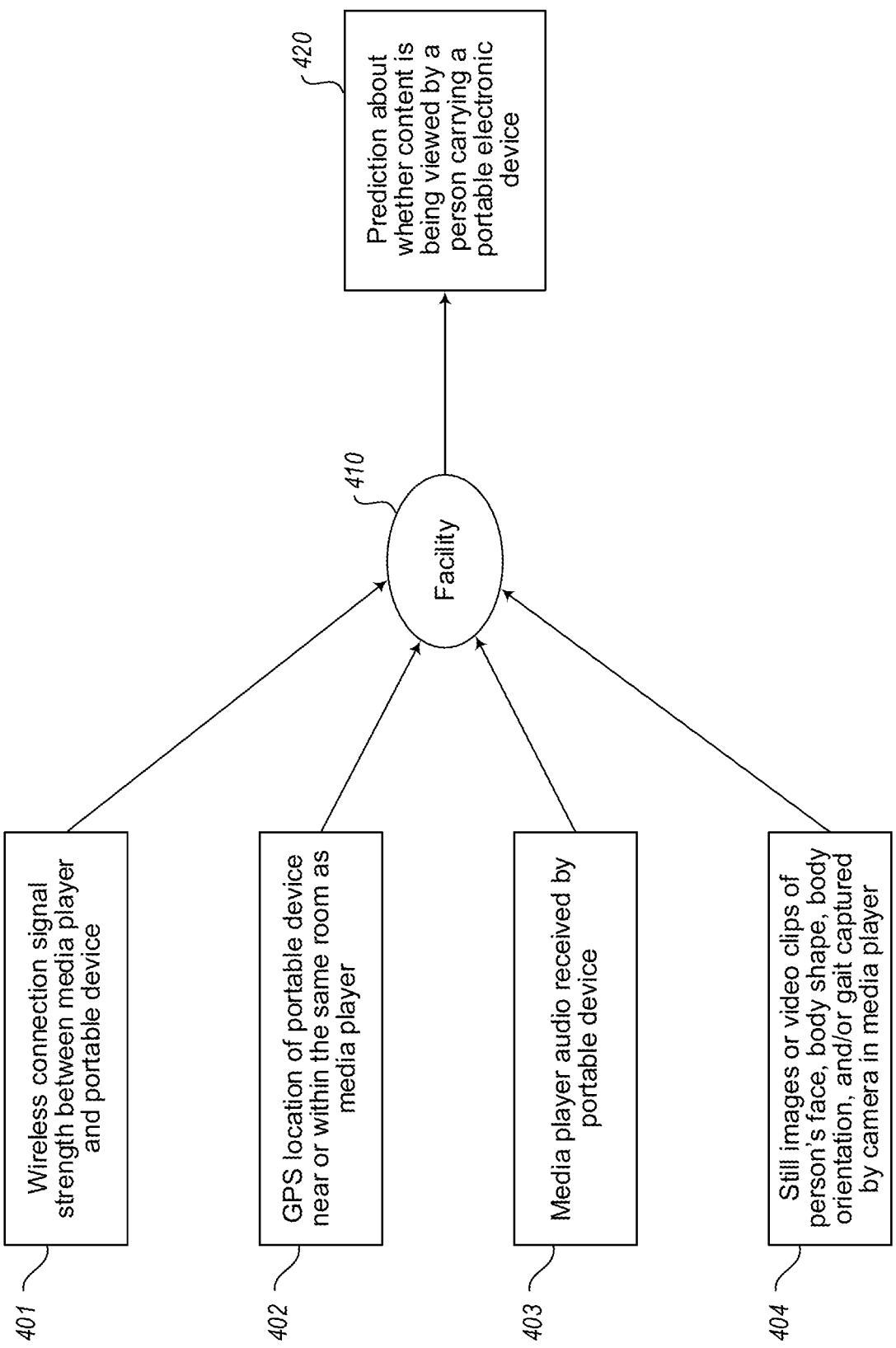
FIG. 4 is a data flow diagram showing conditions considered by the facility in predicting whether content is being viewed by a person carrying a portable electronic device in various embodiments.

FIG. 4 is a data flow diagram showing conditions considered by the facility in predicting whether content is being viewed by a person carrying a portable electronic device in various embodiments. The diagram shows the facility 410 producing a prediction 420 about whether content is being viewed by a person carrying a portable electronic device based upon one or more bodies of potentially relevant data. In some embodiments, the facility considers only mobile devices that have been registered for purposes of the feature. In various embodiments, this involves explicit registration by their users; signing them into the same local wireless network used by the media player; their registration for wide-area wireless service or part of a service plan including the media player; their association with the same mailing address or credit card or other payment mechanism used for the media player; etc.

In some embodiments, the facility considers wireless connection signal strength 401 between the media player and portable devices. In various embodiments, the media player and portable devices seek to connect wirelessly exclusively for the purpose of predicting whether content is being viewed by a person carrying the portable device, or for a larger set of purposes including this one. In various embodiments, the wireless connection is a WiFi connection, a Bluetooth connection, an Infrared connection, etc. In some embodiments, the facility considers the presence or absence of a connection, rather than its strength.

In some embodiments, the facility considers a GPS location 402 of the portable device, and whether it is near the media player, or within the estimated or measured GPS coordinates of the room in which the media player is located.

In some embodiments, the facility considers audio 403 received by the portable device and whether it matches audio being outputted by the media player via the speakers. In some embodiments, the facility also considers the volume at which the audio signal is received, compared to the volume at which the audio is produced by the speakers, to estimate presence in the room containing the media player versus presence in a different room.

In some embodiments, the facility considers still images or video clips captured by a camera in the media player, or in the room but outside the media player. In some embodiments, the facility uses this visual information to identify a person based upon the appearance of their face, the shape of their body, the rhythm and pattern of their gait while walking, etc. In some embodiments, the facility uses this visual information to assess whether a person present in the room is paying attention to the audio/video presentation, based upon such considerations as whether the person's torso and/or head are turned toward the screen, whether the person is sitting up versus lying down, etc. In various embodiments, the facility bases its prediction 420 on various combinations of the considerations discussed above.

Returning to FIG. 3, in act 303, if the facility determines that notifications should be suppressed in the portable device being carried by the person identified in act 302, then the facility continues in act 304, else the continues in act 301. In some embodiments, act 303 includes automatically determining whether notifications should be suppressed.

Figure 5:
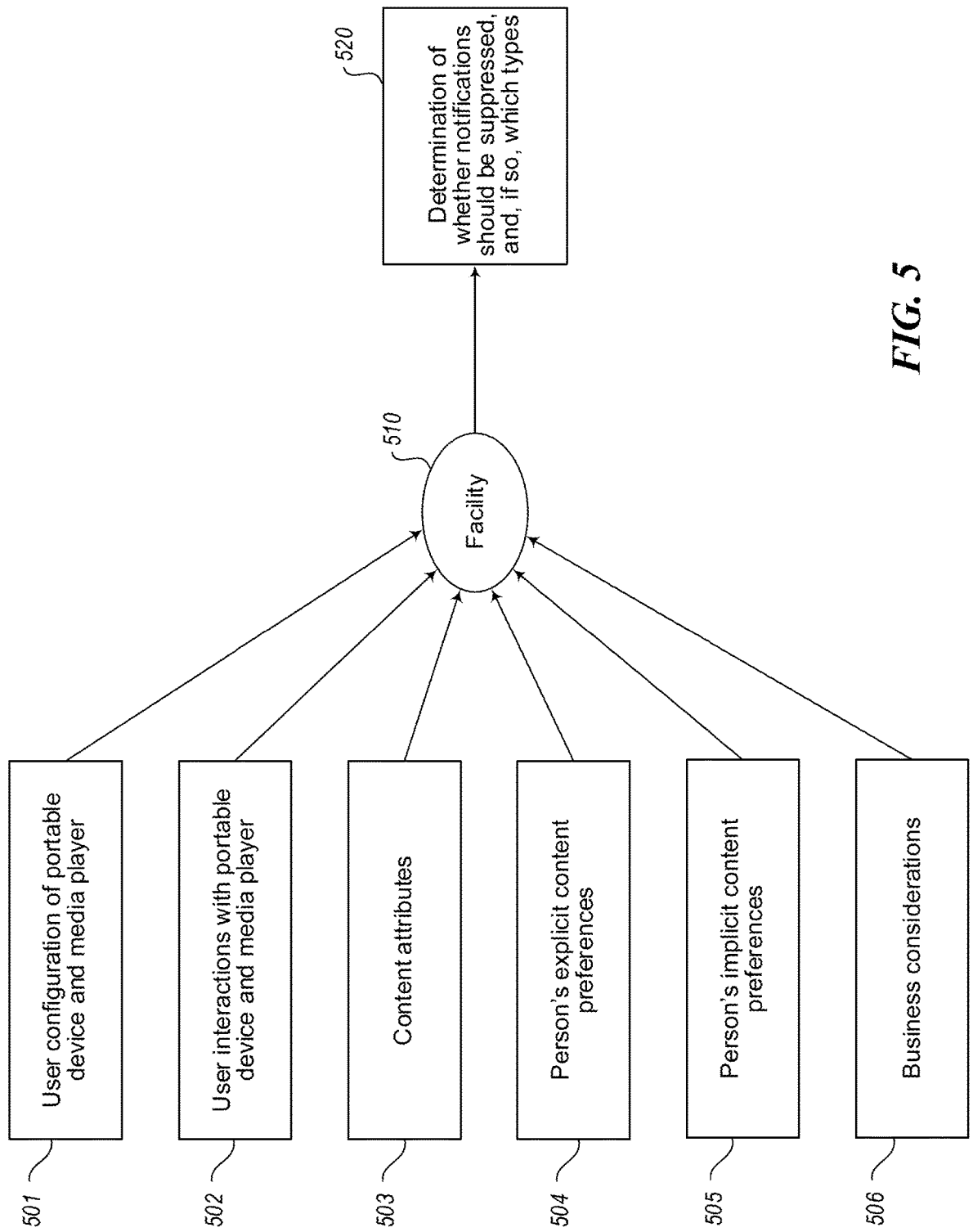
FIG. 5 is a data flow diagram showing an automatic determination by the facility of whether notifications should be suppressed for a particular portable device and, if so, which types of notifications.

FIG. 5 is a data flow diagram showing an automatic determination by the facility of whether notifications should be suppressed for a particular portable device and, if so, which types of notifications. The diagram shows the facility making this automatic determination 520 based upon combinations of one or more of bodies of data. In some embodiments, the facility considers user configurations of the portable device and/or the media player. In various embodiments, these configurations specify whether the notification suppression function is enabled for the portable device or media player; limitations or preferences for this function generally, or with respect to a portable device; etc.

In some embodiments, the facility considers user interactions 502 with the portable device and the media player. In general, user interactions with the portable device make it less likely that the facility will determine to suppress notifications, and interactions with the media player make this more likely. In some embodiments, however, the facility considers particular types of interactions with the portable device that tend to indicate that the user is seeking to pay less attention to the portable device, such as turning off the screen, reducing audio volume, silencing vibrations, closing apps, shutting down or restarting, etc. Similarly, in some embodiments, the facility considers types of user interactions with the media player that suggest that the user is not interested in paying attention to it, such as reducing or muting the volume, pausing playback, rating played content negatively, etc.

In some embodiments, the facility considers attributes of the content being played by the media player, either in isolation, or in comparison to either explicit content preferences 504 of the person or implicit content preferences 505 of the person. For example, if content is being played that is viewed as being less interesting with near-universality—such as commercials, credits, or messages about upcoming programming—the facility is, in some embodiments, is less likely to determine that notifications should be suppressed, while in some embodiments the playing of other types of content make it more likely that the facility will determine to suppress notifications. In some embodiments, the facility compares the type of the content being played to content preferences explicitly expressed by the person, such as filling out surveys about preferred content types; setting up certain categories into which to classify content; explicitly rating individual pieces of content while they are being played or at the conclusion of their playing; etc. In some embodiments, the facility compares the attributes of content being played to content preferences implicitly expressed by the person, such as turning the volume up or down while certain content is being played; speeding up or slowing down playback; rewinding content; playing games on the portable device corresponding to certain audio/video content types, such as particular movies or television series; interrupting the playing of certain content and not resuming it; turning toward or away from the screen when certain content is played; increasing or decreasing portable device use when certain content is played; searching about content of certain types; leaving or entering the room when certain content is played; etc.

In some embodiments, the facility considers business considerations 506 in making the determination. For example, where an operator of the facility or an affiliate could realize additional revenue or save further costs as the result of the person's attention to the content currently being played, in some embodiments the facility is more likely to determine to suppress notifications. This may be true, for example, where the amount an advertiser pays for an advertising message is conditioned on a measure of the user's attention to the advertising message and/or portable device notifications being suppressed; where the price paid for advertising depends on a conversion rate or revenue that can be tied to presentation of the advertising message to the person; etc. In various embodiments, the facility considers various combinations of the factors discussed above in making the determination.

In some embodiments, the facility also automatically determines which types of notifications should be suppressed on the portable device. In some embodiments, these types are explicitly configured by the device's user. In some embodiments notification types are organized in a hierarchy, and the facility selects a threshold within the hierarchy, such that notification types below the threshold in the hierarchy are suppressed, and notification types above the threshold in the hierarchy are not suppressed. In some embodiments, the facility uses the same hierarchy of notification types for each user. In some embodiments, the facility automatically constructs the hierarchy for each user, based upon such factors as the types of applications installed on the portable device, the usage levels of the applications on the portable device, the rate at which the user interacts with each applications while viewing content, etc. In some embodiments, each user establishes his or her own hierarchy of notification types. In some embodiments, the facility suspends notifications of types that would be redundant with the content being viewed, such as by suspending news headline notifications while viewing a live news program.

Returning to FIG. 3, in act 304, the facility selects notification types to suppress. In act 305, the facility suppresses the notifications of the selected types on the portable device. In some embodiments, this involves setting a do-not-disturb ("DND") configuration setting on the device. In some embodiments, it involves setting notification settings for individual applications on the device. In various embodiments, the facility uses a scheduler component of the portable device's operating system to modify the device's notification settings, or spoofs user interactions with the device, such as with an installable third-party keyboard or input device. After act 305, the facility continues in act 301 to consider suppressing notifications for additional portable devices.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 6:
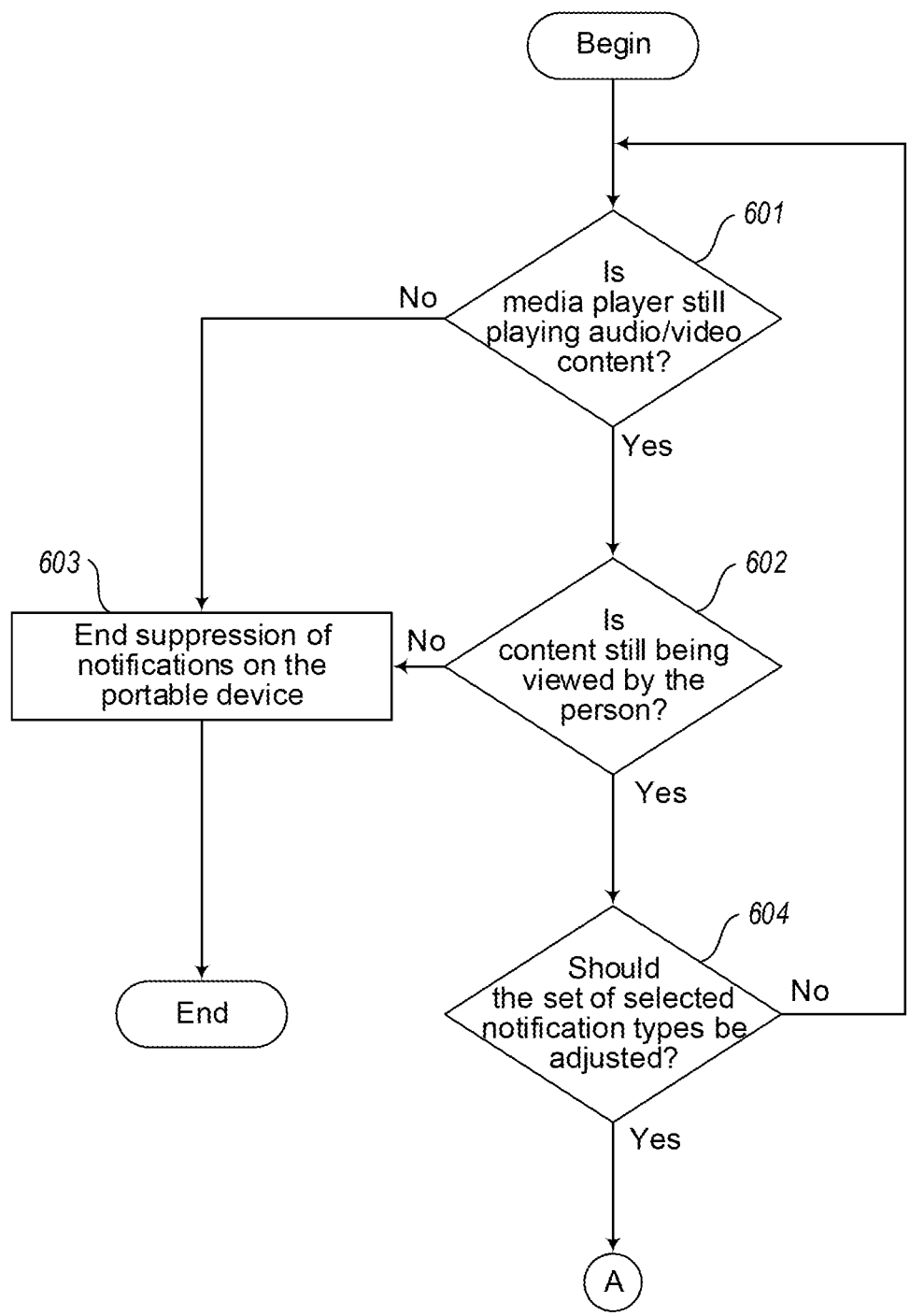
FIG. 6 is a flow diagram showing a process performed by the facility in some embodiments in order to adjust or end its suppression of notifications on a portable device.

FIG. 6 is a flow diagram showing a process performed by the facility in some embodiments in order to adjust or end its suppression of notifications on a portable device. In act 601, if the media player is still playing audio/video content, the facility continues is act 602, else the facility continues in act 603. In act 602, if the content being played by the media player is still being viewed by the person, the facility continues in act 604, else the facility continues in act 603. In some embodiments, act 602 considers the factors considered above in connection with FIG. 4. In act 603, the facility ends the suppression of the notifications on the portable device. In various embodiments, the facility performs act 603 using techniques described above in connection with act 305. After act 603, this process concludes. In act 604, if the set of selected notification types should be adjusted, then the facility continues via connector A to 304 in order to perform this adjustment, else the facility continues in act 601 to continue to consider whether notifications on the portable device should continue.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A portable electronic device, comprising:
a radio configured to receive wireless transmissions targeted to the portable electronic device;
a notification subsystem configured to generate notifications in response to the radio's receipt of at least a portion of the received wireless transmissions targeted to the portable electronic device;
an output device configured to generate user output in response to the notifications generated by the notification subsystems;
a notification suspension subsystem configured to, in response to determining that the portable electronic device is in the possession of a person who is viewing audio/video content being played by a media player device, inhibit the generation by the output device of user output in response to at least some of the notifications generated by the notification subsystems; and
a processor configured to execute an operating system capable of installing virtual input devices,
wherein the notification suspension subsystem is configured to interact with a virtual input device installed by the operating system to perform counterfeit user interactions that have the effect of inhibiting the generation by the output device of user output in response to at least some of the notifications generated by the notification subsystems.

2. The portable electronic device of claim 1 wherein the radio is further configured to receive indications of the audio portion of audio/video content being played by the media player device,
the portable electronic device further comprising:
a microphone configured to receive ambient audio; and
a sound comparison subsystem configured to compare the ambient audio received by the microphone to the indicated audio portion of audio/video content being played by the media player device,
and wherein the notifications suspension subsystem is configured to determine that the portable electronic device is in the possession of a person who is viewing audio/video content being played by a media player device based at least in part on results of the comparison by the sound comparison subsystem.

3. The portable electronic device of claim 1,
wherein the processor is configured to execute an operating system having a scheduler component,
wherein the notification suspension subsystem is configured to invoke the scheduler component to inhibit the generation by the output device of user output in response to at least some of the notifications generated by the notification subsystems.

4. The portable electronic device of claim 1, further comprising:
one or more user input devices configured to receive user interactions,
wherein the notifications suspension subsystem is configured to determine that the portable electronic device is in the possession of a person who is not viewing audio/video content being played by a media player device based at least in part on at least a minimum level of user interactions received by the one or more user input devices.

* * * * *